H. G. Nelson,

Turbine Water Wheel.

No. 1,187. Reissued May 21, 1861.

N. PETERS, PHOTO-LITHOGRAPHER, WASHINGTON, D. C.

UNITED STATES PATENT OFFICE.

HENRY G. NELSON, OF MEXICO, NEW YORK.

IMPROVEMENT IN WATER-WHEELS.

Specification forming part of Letters Patent No. 29,810, dated August 28, 1860; Reissue No. 1,187, dated May 21, 1861.

*To all whom it may concern:*

Be it known that I, HENRY G. NELSON, late of Lockport, in the county of Niagara and State of New York, but now of Mexico, in the county of Oswego and State of New York, have invented a new and Improved Horizontal Water-Wheel; and I do hereby declare that the following is a full, clear, and exact description of the same, reference being had to the annexed drawings, making a part of this specification, in which—

Figure 1:
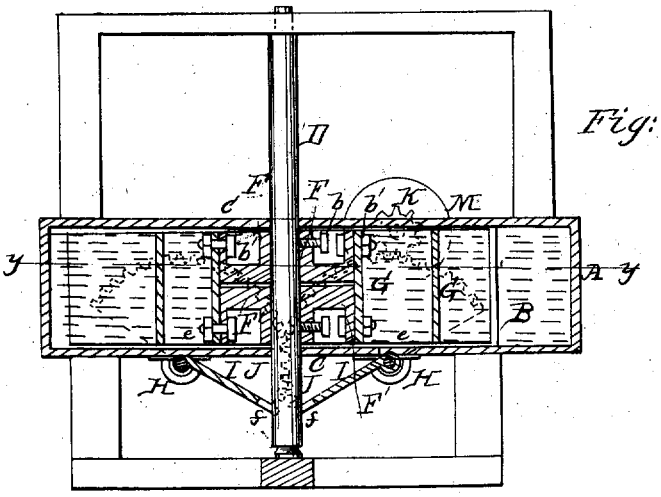
Figure 3:
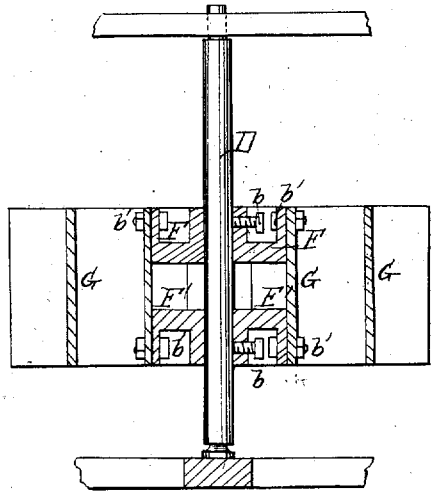
Figure 2:
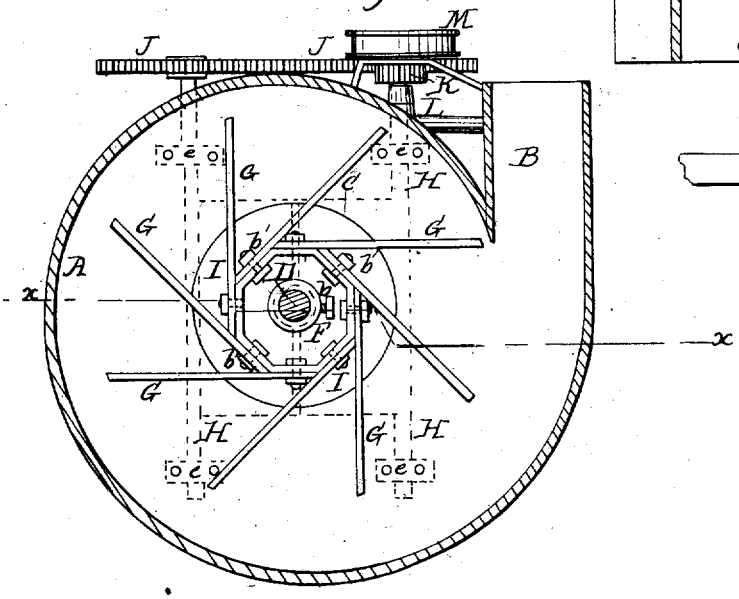

Figure 1 is a vertical section of my invention, taken in the line *xx;* Fig. 2, a horizontal section of the same, taken in the line *y y*, Fig. 1. Fig. 3 is an explanatory diagram.

Similar letters of reference indicate corresponding parts in the three figures.

To enable those skilled in the art to fully understand and construct my invention, I will proceed to describe it.

A represents the scroll of the wheel, B the water induction passage, and C a central vent or discharge-opening. D is the shaft of the wheel, having its lower end stepped at *a* in a framing, E, which supports the scroll A. On the shaft D are two polygonal flanged collars performing a divided adjustable hub, F F′, which parts are placed and secured upon the shaft D by screw-bolts *b* in each part F F′. This divided hub may be of cast-iron or other material, and each part has projecting from it a flange, *c*, said flanges being in the same planes as the faces of the hub, and forming, in fact, portions of the faces, as will be seen by referring to Figs. 1 and 3. To each face or side of the divided hub F F′ there is secured a bucket, G, by bolts *b′*, said bolts passing through the flanges *c*, and the two parts, F F′, are thus connected by each bucket. The buckets G are simply wrought-iron plates of a suitable length and height. Wood or cast-iron might be used, but wrought-iron would be preferable. However, I am not confined to any material. The shaft D is of wrought-iron, and the scroll A of cast-iron.

To the under side of the scroll A there are attached the parallel shafts H H at opposite sides of the vent C. These shafts are allowed to turn freely in their bearings *e*, and to each shaft a gate, I, is attached, each gate having a semicircular notch, *f*, made in it that it may when closed fit snugly around the shaft D. The two gates I I, when closed, cover the vent or opening C and prevent the escape of water from the scroll A.

The outer ends of the shafts H H are provided with geared sectors J J, which mesh into each other, and into one of the sectors, J, a pinion, K, gears, said pinion being on a shaft, L, which has a wheel, M, at its outer end. The gates I I, in consequence of being connected by the geared sectors J J, are raised and lowered simultaneously, and the discharge of the water from the scroll A, and consequently the speed of the wheel may be regulated as desired and with greater facility than usual.

By having the wheel formed by bolting buckets to the sides or faces of a polygonal hub a very simple, cheap, and durable wheel is obtained, as all the work required is simply to bolt the buckets to the hub. In case of a bucket being injured, it may be readily detached and replaced by a new one.

By having the hub divided or made in the form of two separate polygonal flanged parts or collars the said parts will form a sufficient hub for carrying different-sized buckets. My improvement may thus be extensively applied to various sizes and kinds of wheels.

Fig. 3 is a diagram showing the hubs set apart or adjusted upon the shaft, with a space between them, and buckets of greater width attached than the buckets shown in Fig. 1, there being no change in the relative sizes of the parts except in the width of the buckets.

When the hubs are set apart from each other, as in Fig. 3, there is an open space between them. Thus large wheels may be constructed without any additional weight of hub; whereas the common construction involves increased weight of hub with increased size or draft of wheel. Wheels constructed with my improvement will therefore move easier and more economically size for size than wheels constructed in the ordinary manner.

I do not claim, broadly, the employment or use of gates placed at the discharge orifice or vent of the scroll or penstock of a water-wheel, for gates thus placed have been previously used, although arranged differently from the plan herein shown and described, and not so convenient to operate.

I am aware that wheels with divided hubs have been previously used. The advantage of this part of my invention consists in the facility afforded for securely attaching buckets formed of flat plates of metal or wood.

Having thus described my invention, what I claim therein as new, and desire to secure by Letters Patent, is—

1. The combination of the polygonal flanged adjustable collars F F′ *c* with buckets G, formed of simple plates of metal or other material, forming connections between the said collars, and secured to flanges *c*, by bolts, *b*′, all as herein shown and described, and for the purposes explained.

2. The arrangement of the gates I I, shafts H H, and sectors J J with the shaft D, vent C, and case A, all as herein shown and described, for the purpose set forth.

HENRY G. NELSON.

Witnesses:
TIMOTHY W. SKINNER,
JOHN J. LANNOREE.